US011330676B2

(12) United States Patent
Everly et al.

(10) Patent No.: US 11,330,676 B2
(45) Date of Patent: May 10, 2022

(54) BARE HEATING ELEMENTS FOR HEATING FLUID FLOWS

(71) Applicant: Watlow Electric Manufacturing Company, St. Louis, MO (US)

(72) Inventors: Mark D. Everly, St. Charles, MO (US); Mike Bange, Elsberry, MO (US); Jeremy Ohse, St. Louis, MO (US); Richard T. Williams, Genoa City, WI (US); Sanhong Zhang, Ballwin, MO (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 303 days.

(21) Appl. No.: 15/448,186

(22) Filed: Mar. 2, 2017

(65) Prior Publication Data
US 2017/0273146 A1    Sep. 21, 2017

Related U.S. Application Data

(60) Provisional application No. 62/302,501, filed on Mar. 2, 2016.

(51) Int. Cl.
*H05B 3/78* (2006.01)
*H05B 3/16* (2006.01)
(Continued)

(52) U.S. Cl.
CPC .............. *H05B 3/78* (2013.01); *B01D 53/944* (2013.01); *B01D 53/9418* (2013.01); *H05B 3/06* (2013.01);
(Continued)

(58) Field of Classification Search
CPC .... B01D 53/9418; B01D 53/944; H05B 3/78; H05B 3/06; H05B 3/08; H05B 3/16; H05B 3/46; H05B 3/64; F24H 1/103
See application file for complete search history.

(56) References Cited

U.S. PATENT DOCUMENTS 1,539,497 A    5/1925  Longoria
1,967,757 A *  7/1934  Losee .................. F24H 3/0417
                                                            392/365
(Continued)

FOREIGN PATENT DOCUMENTS

CN         1555474 A      12/2004
CN         102200345       9/2011
(Continued)

OTHER PUBLICATIONS

ISRWO of PCT/US2017/020524 mailed Jun. 14, 2017.
(Continued)

*Primary Examiner* — John J Norton
(74) *Attorney, Agent, or Firm* — Burris Law, PLLC (57) ABSTRACT

A heater for use in heating a fluid flow through a passageway is provided that includes a continuous resistive heating element having a predefined shape that is directly exposed to the fluid flow. The predefined shape includes a cross-sectional geometry that provides a required heat distribution, structural strength, and reduced back pressure within the passageway. The predefined shape may include airfoils, while the cross-sectional geometry provides a required heat distribution, structural strength, and reduced back pressure within the passageway.

20 Claims, 12 Drawing Sheets

(51) Int. Cl.
  *H05B 3/06* (2006.01)
  *B01D 53/94* (2006.01)
  *F01N 3/08* (2006.01)
  *F01N 3/021* (2006.01)
  *F24H 3/04* (2022.01)
  *F01N 3/027* (2006.01)
  *F01N 3/20* (2006.01)

(52) U.S. Cl.
  CPC ............... *H05B 3/16* (2013.01); *F01N 3/021* (2013.01); *F01N 3/027* (2013.01); *F01N 3/0842* (2013.01); *F01N 3/2013* (2013.01); *F01N 3/2066* (2013.01); *F01N 2240/16* (2013.01); *F24H 3/0405* (2013.01); *H05B 2203/003* (2013.01); *H05B 2203/022* (2013.01); *H05B 2203/024* (2013.01)

(56) References Cited

U.S. PATENT DOCUMENTS

| | | | | |
|---|---|---|---|---|
| 2,277,912 A * | 3/1942 | Johnson | H01C 3/10 | 338/280 |
| 2,721,920 A * | 10/1955 | Weide | H01C 3/10 | 338/293 |
| 3,651,304 A * | 3/1972 | Fedor | F24H 3/0405 | 219/200 |
| 3,860,789 A * | 1/1975 | Maake | H05B 3/32 | 219/532 |
| 4,011,395 A * | 3/1977 | Beck | H05B 3/64 | 373/134 |
| 4,025,754 A * | 5/1977 | Marzonie | D06F 58/26 | 219/400 |
| 4,051,452 A * | 9/1977 | Luy | H01C 1/08 | 338/51 |
| 4,090,061 A * | 5/1978 | Glucksman | F24H 3/0405 | 338/294 |
| 4,100,526 A * | 7/1978 | Kirilloff | H01C 3/10 | 338/279 |
| 4,471,213 A * | 9/1984 | Yoshida | A45D 20/12 | 219/532 |
| 4,626,667 A * | 12/1986 | Asano | H05B 3/32 | 219/458.1 |
| 4,651,124 A * | 3/1987 | Kirilloff | H01C 3/10 | 338/531 |
| 4,849,608 A * | 7/1989 | Muraoka | C30B 25/10 | 219/390 |
| 4,857,707 A * | 8/1989 | Dall | D06F 58/26 | 392/485 |
| 5,045,831 A * | 9/1991 | Kirilloff | H01C 3/10 | 338/280 |
| 5,157,373 A * | 10/1992 | Bertram | H01C 1/08 | 338/279 |
| 5,221,917 A * | 6/1993 | Cummins | H01C 1/08 | 338/280 |
| 5,304,978 A * | 4/1994 | Cummins | B60L 7/02 | 338/280 |
| 5,620,666 A * | 4/1997 | Usui | B01D 53/9454 | 29/890.08 |
| 5,686,880 A * | 11/1997 | Cummins | H01C 1/084 | 338/280 |
| 5,749,223 A | 5/1998 | Kreucher et al. | | |
| 5,877,674 A * | 3/1999 | Berger, II | H01C 1/014 | 338/280 |
| 6,048,510 A | 4/2000 | Zauderer | | |
| 6,277,784 B1 | 8/2001 | Kruse | | |
| 6,287,523 B1 * | 9/2001 | Hirohashi | B01D 53/885 | 422/177 |
| 6,444,960 B1 | 9/2002 | Rodriguez | B41J 2/41 | 219/543 |
| 6,941,754 B2 | 9/2005 | Aldridge et al. | | |
| 7,196,295 B2 * | 3/2007 | Fennewald | H05B 3/28 | 219/543 |
| 7,539,401 B2 * | 5/2009 | Takai | B29B 13/023 | 219/532 |
| 7,866,283 B2 | 1/2011 | Clark et al. | | |
| 8,444,741 B2 | 5/2013 | Bruck | | |
| 8,591,820 B2 | 11/2013 | Boger et al. | | |
| 8,763,379 B2 | 7/2014 | Yoshioka | | |
| 2002/0017518 A1 | 2/2002 | Danko | | |
| 2002/0090209 A1 * | 7/2002 | VonArx | F24H 1/102 | 392/451 |
| 2003/0089701 A1 * | 5/2003 | Sherrill | H05B 3/16 | 219/536 |
| 2005/0175328 A1 * | 8/2005 | Pierron | B60H 1/2225 | 392/347 |
| 2007/0023411 A1 * | 2/2007 | Angelis | B60H 1/2225 | 219/202 |
| 2008/0083733 A1 * | 4/2008 | Takai | H05B 3/265 | 219/448.17 |
| 2008/0261806 A1 * | 10/2008 | Konstandopoulos | B01D 53/944 | 502/303 |
| 2010/0132921 A1 * | 6/2010 | Moskal | B21D 31/02 | 165/104.19 |
| 2010/0237059 A1 * | 9/2010 | Porterfield | H05B 3/82 | 219/482 |
| 2014/0190151 A1 * | 7/2014 | Culbertson | F01N 3/26 | 60/303 |
| 2014/0343747 A1 * | 11/2014 | Culbertson | G05D 23/19 | 700/300 |
| 2014/0366513 A1 * | 12/2014 | Mueller-Haas | F01N 3/208 | 60/295 |
| 2016/0067668 A1 | 3/2016 | Timken et al. | | |

FOREIGN PATENT DOCUMENTS

| | | | |
|---|---|---|---|
| CN | 202083099 | 12/2011 | |
| CN | 103442788 A | 12/2013 | |
| DE | 102005063081 | 7/2007 | |
| DE | 102005063081 A1 | 7/2007 | |
| DE | 102007001451 | 7/2008 | |
| DE | 102007001451 A1 * | 7/2008 | ........... B60H 1/2225 |
| DE | 102012004291 A1 | 9/2013 | |
| EP | 3214284 | 9/2017 | |
| FR | 2117287 | 7/1972 | |
| FR | 2929326 | 10/2009 | |
| FR | 2929326 A1 | 10/2009 | |
| FR | 2929326 A1 * | 10/2009 | ........... F01N 3/2892 |
| GB | 7860 | 7/1910 | |
| GB | 214058 | 4/1924 | |
| GB | 630868 | 10/1949 | |
| GB | 651777 | 4/1951 | |
| GB | 951141 | 3/1964 | |
| GB | 1340539 | 12/1973 | |
| GB | 1340539 A * | 12/1973 | ............... H05B 3/16 |
| JP | S517327 | 3/1976 | |
| JP | H07217508 | 8/1995 | |
| JP | 2015133227 | 7/2015 | |
| WO | 2003086018 | 10/2003 | |
| WO | 2004112433 | 12/2004 | |
| WO | 2004112433 A1 | 12/2004 | |
| WO | 2008135354 | 11/2008 | |
| WO | 2014176585 | 10/2014 | |
| WO | 2014176585 A1 | 10/2014 | |
| WO | 2015144520 | 10/2015 | |

OTHER PUBLICATIONS

European Search report for EP Application No. 20200599, dated Nov. 19, 2020.

European Extended Search Report and Written Opinion for corresponding European Application No. EP21193371.8 dated Sep. 29, 2021, 6 pages.

* cited by examiner

Example alternate airfoil shapes

Ellipsoid

BARE HEATING ELEMENTS FOR HEATING FLUID FLOWS

CROSS-REFERENCE TO RELATED APPLICATIONS

This application claims priority to and the benefit of U.S. provisional application Ser. No. 62/302,501, filed on Mar. 2, 2016, the contents of which are incorporated herein by reference in their entirety. This application is also related to co-pending applications titled "Virtual Sensing System", "System For Axial Zoning of Heating Power," "Advanced Two-Wire Heater System for Transient Systems," "Heater Element Having Targeted Decreasing Temperature Resistance Characteristics," "Dual-Purpose Heater and Fluid Flow Measurement System," "Heater-Actuated Flow Bypass," "Susceptor for Use in a Fluid Flow System," and "Thermal Storage Device for Use in a Fluid Flow System," concurrently filed herewith, the contents of which are incorporated herein by reference in their entirety.

FIELD

The present disclosure relates to heating elements, and more particularly to heating elements for use in heating fluid flows, such as diesel exhaust gas.

BACKGROUND

The statements in this section merely provide background information related to the present disclosure and may not constitute prior art.

Diesel engines generally have relatively high nitrogen oxide (NOx) and particulate emissions. Various devices and methods have been employed in order to reduce these emissions, which can be harmful to the atmosphere/environment. For example, a diesel particulate filter (DPF) is used downstream of an engine to filter particulates from the engine exhaust. A DPF is periodically cleaned by burning off accumulated soot, through active regeneration, which uses a heater upstream of the DPF to raise the exhaust stream temperature to a temperature suitable for regeneration.

Passive regeneration is an alternative to active regeneration, wherein a reaction between accumulated particles and oxygen in the exhaust stream (usually in the form of $O_2$ and $NO_2$) results in some of the particles oxidizing. However, passive regeneration generally occurs too slowly to remove accumulated particles, and thus a catalyst can be used, which is often referred to as a diesel oxidation catalyst (DOC). The DOC is also positioned upstream of the DPF and causes NO in the exhaust stream to convert to $NO_2$, thereby facilitating passive regeneration when the $NO_2$ reacts with the particles in the DPF.

To reduce NOx emissions, NOx catalysts such as selective catalytic reduction catalysts (SCR) or lean NOx catalysts (LNC) can be provided in the exhaust stream. SCR catalysts are presently most common and can be very efficient at reducing NOx emissions to $N_2$ using $NH_3$ over a catalyst. However, these catalysts typically operate most efficiently at relatively high temperatures, and thus heaters have been employed in order to achieve these temperatures.

Although various forms of heaters have been used in exhaust streams to achieve the aforementioned emissions reductions, such heaters can negatively impact engine performance and add cost and complexity to the overall vehicle.

SUMMARY

Generally, the present disclosure provides a heater, heater system, and related methods, to heat a fluid flow (e.g. a flow of diesel exhaust gas) that uses a resistive heating element that is directly exposed to the flow and that has a cross-section that is shaped to provide strength for applications including shock, vibration or high flow velocity, and to compensate for the trade-offs between cost, size, heat transferred to the flow, back pressure and strength/vibration resistance.

In its various forms, the present disclosure provides a heater or system that heats a flow of a fluid (e.g. a flow of diesel exhaust gas) while providing physical robustness greater than that which can be achieved using a resistive heating element with a round (e.g. a wire), foil or ribbon (e.g. a flat) cross-section.

In one form, a heater for use in heating a fluid flow through a passageway is provided where the heater comprises a continuous resistive heating element having a predefined shape and the resistive heating element is directly exposed to the fluid flow. The predefined shape includes a cross-sectional geometry that provides a required heat distribution, structural strength, and reduced back pressure within the passageway.

The present disclosure further provides a heater for use in heating a fluid flow through a passageway that includes at least one resistive heating element having a cross-sectional geometry defining a predefined shape of an airfoil. The resistive heating element is directly exposed to the fluid flow. The cross-sectional geometry is operable to provide the required heat distribution, structural strength, and reduced back pressure within the passageway.

In yet another form, the present disclosure provides a heater for use in heating a fluid flow including a plurality of resistive heating elements. Each resistive heating element defines a predefined shape and is directly exposed to the fluid flow. The heater further includes a corresponding plurality of dielectric members arranged between adjacent resistive heating elements. The predefined shape may include a cross-sectional geometry that is operable to provide the required heat distribution, structural strength, and reduced back pressure.

In still another form, a fluid conduit including one of the abovementioned heaters is provided where the fluid conduit comprises an interior wall and at least one dielectric member disposed between the interior wall and the resistive heating elements and an electrical box affixed to the fluid conduit adapted to protect electrical connections to the heater, where the electrical box further includes at least one of a current switching device and a distributed operations system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 through 7, a heater for use in heating a fluid flow through a passageway 10 is illustrated and indicated by reference numeral 20. Generally, the heater 20 includes a continuous resistive heating element 30 having a predefined shape, (many varieties of which will be illustrated and described in greater detail below), with the resistive heating element 30 being directly exposed to the fluid flow F, i.e. without any insulation or sheath surrounding the resistive heating element 30. The predefined shape includes a cross-sectional geometry that provides a required heat distribution, structural strength, and reduced back pressure within the passageway.

More specifically, with reference to FIGS. 1 through 4, the predefined shape in one form includes two leg portions 40, 41 each leg portion having a serpentine shape as shown with opposed segments 42, 44. Each opposed segment 42, 44 is separated by dielectric members 46 in order to provide the requisite dielectric spacing therebetween. The continuous resistive heating element 30 also includes termination portions 48 and 50 for connection to a power supply and/or controller (not shown).

Figure 1:
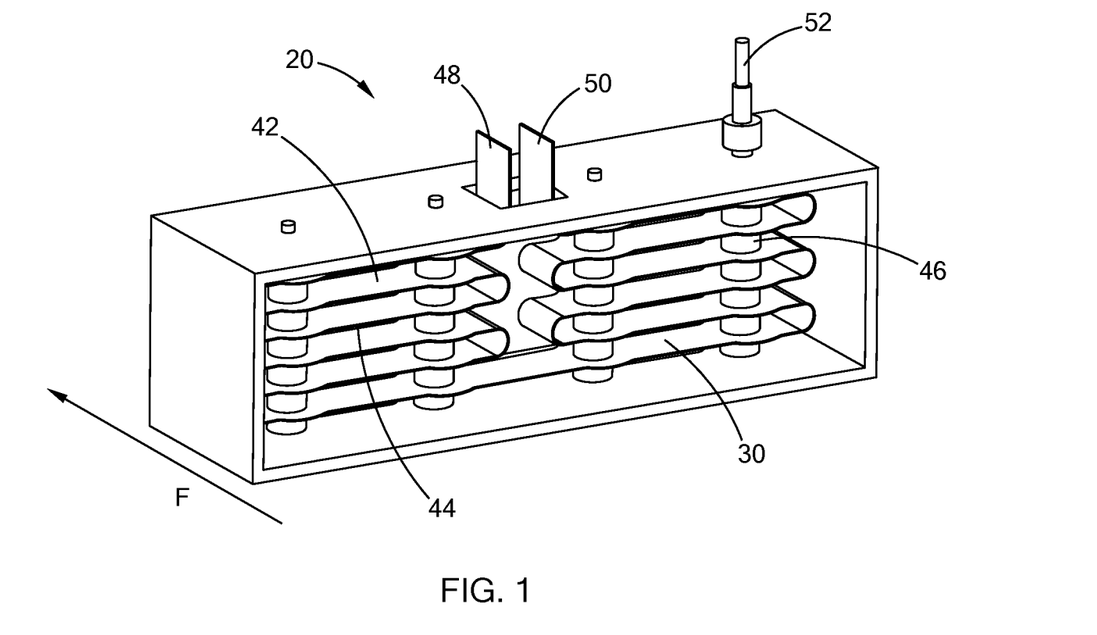
FIG. 1 is a perspective view of one form of a heater for use in heating a fluid flow and constructed in accordance with the teachings of the present disclosure.
Figure 2:
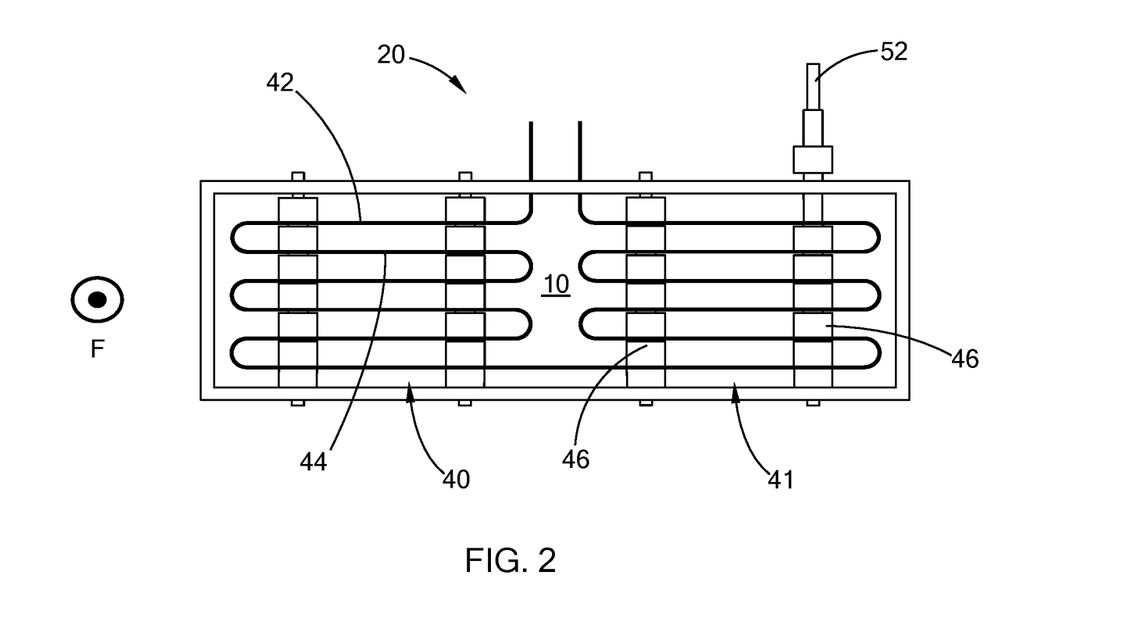
FIG. 2 is a front view, normal to the direction of fluid flow, of the heater of FIG. 1.

As further shown in FIGS. 1 and 2, the dielectric members 46 in one form are bushings. The bushings 46 are disposed between the opposed segments 42, 44 and extend transversely therethrough. The bushings 46 are further supported by transverse members 52 extending through their centers as shown.

Figure 3:
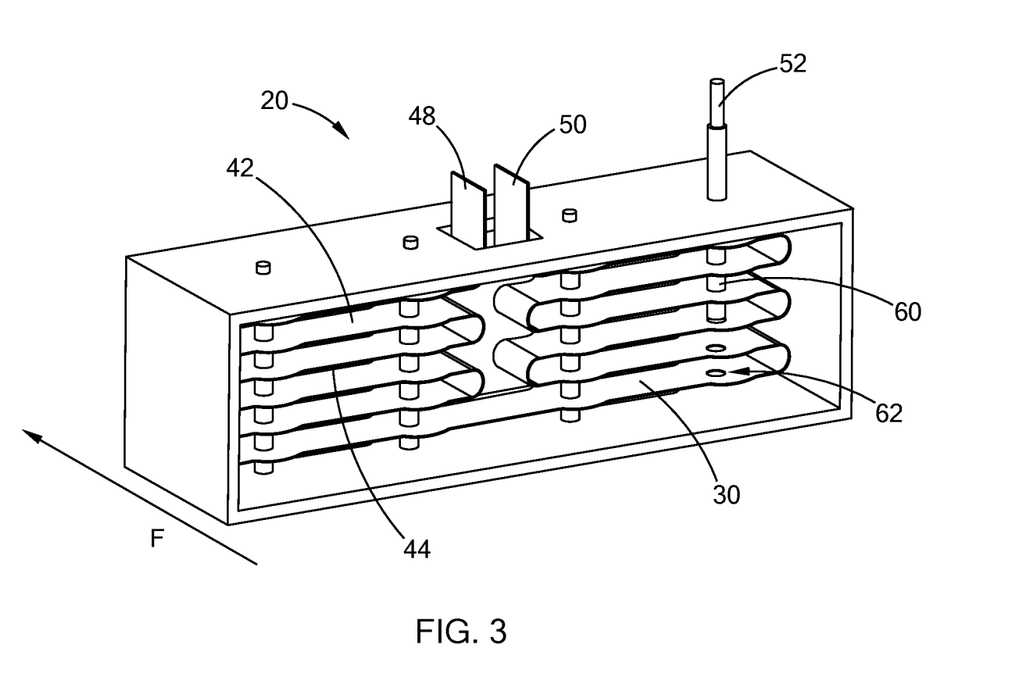
FIG. 3 is a perspective view of another form of a heater for use in heating a fluid flow and constructed in accordance with the teachings of the present disclosure.
Figure 4:
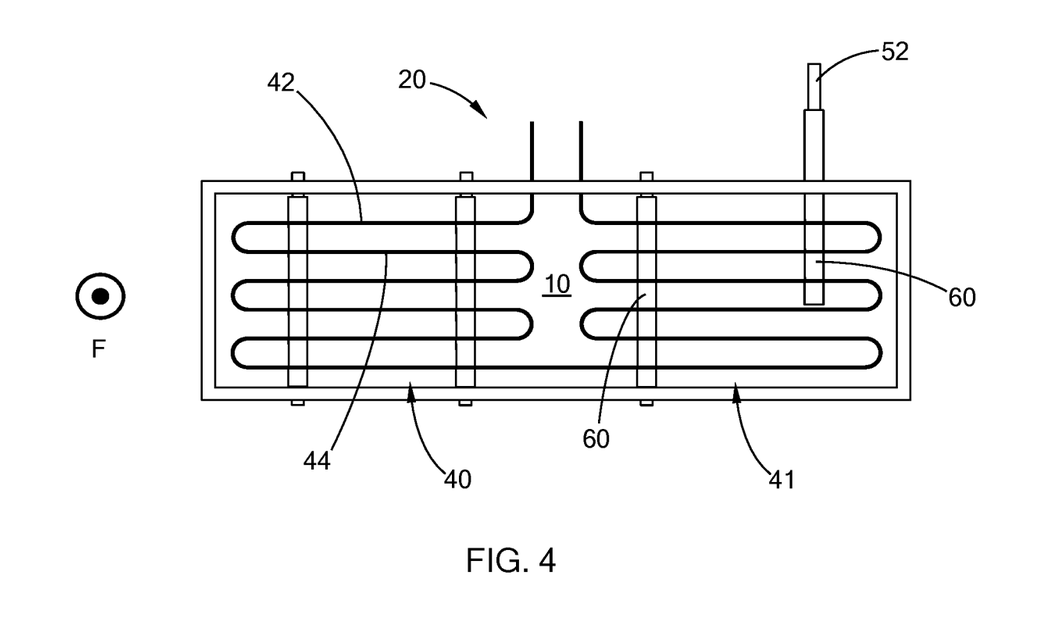
FIG. 4 is a front view, normal to the direction of fluid flow, of the heater of FIG. 3.

A similar configuration is shown in FIGS. 3 and 4, where the opposed segments 42, 44 are separated by dielectric members in the form of tubes 60. The tubes 60 similarly have transverse support members 52 as with the previous form. Additionally, the continuous resistive heating element 30 includes apertures 62 through which the dielectric members 46/60 and their support member 52 extend.

Although the opposed segments 42, 44 are spaced equally and the dielectric members 46/60 are distributed laterally, it should be understood that alternate spacing and locations for each of the continuous resistive heating elements 30 and the dielectric members 46/60 may be provided while remaining within the scope of the present disclosure.

In one form, the dielectric members 46/60 (which are ceramic) are actively brazed to the continuous resistive heating element 30. Additional brazing may include, by way of example, Alumina, Mo—Mn, Ni-plating, or copper brazing, among others. It should be understood, however, that other types of connections, such as mechanical fasteners or adhesive bonding, may be employed while remaining within the scope of the present disclosure. Such connections shall be understood to apply to the various design alternatives that follow as well.

Figure 5:
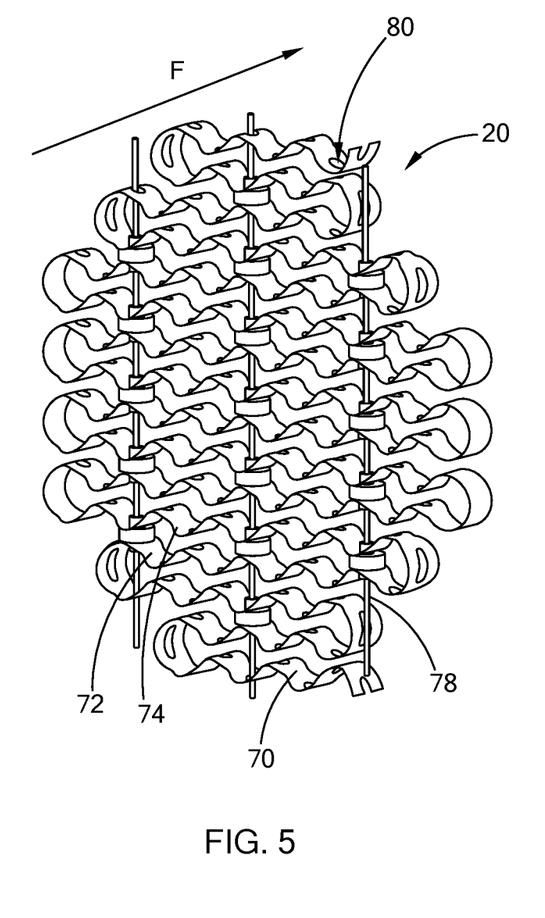
FIG. 5 is a perspective view of another form of a heater for use in heating a fluid flow and constructed in accordance with the teachings of the present disclosure.
Figures 6, 7:
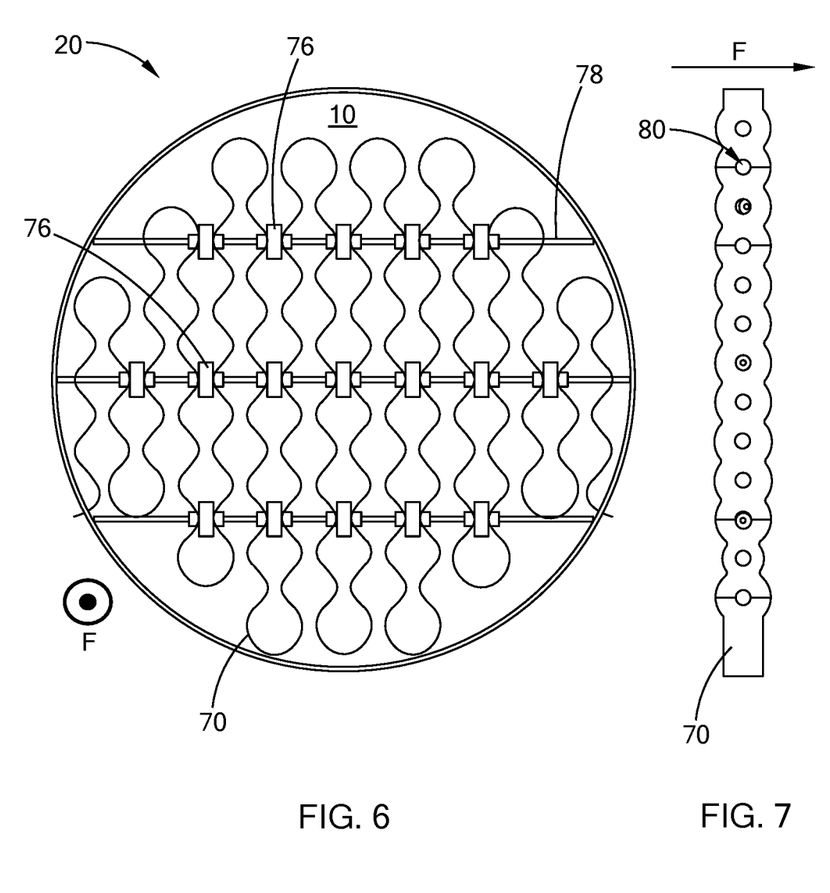
FIG. 6 is a front view, normal to the direction of fluid flow, of the heater of FIG. 5 and rotated 90 degrees.
FIG. 7 is a side view of the heater of FIGS. 5 and 6.
Figure 8:
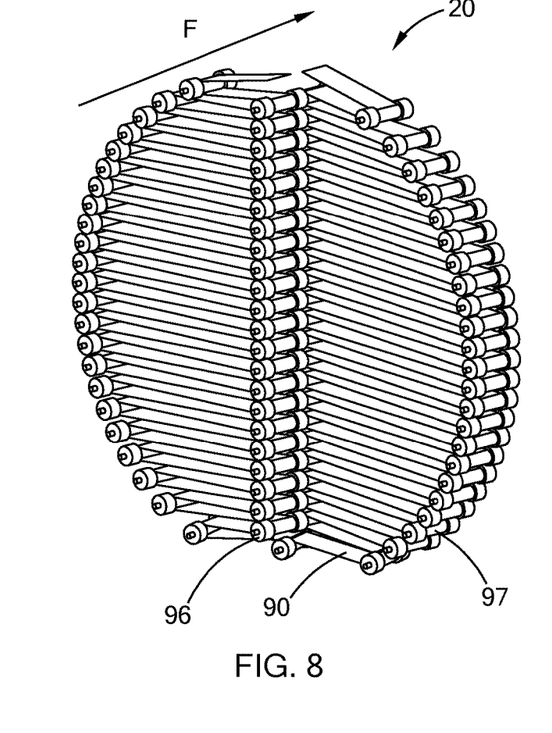
FIG. 8 is a perspective view of another form of a heater for use in heating a fluid flow and constructed in accordance with the teachings of the present disclosure.
Figure 9:
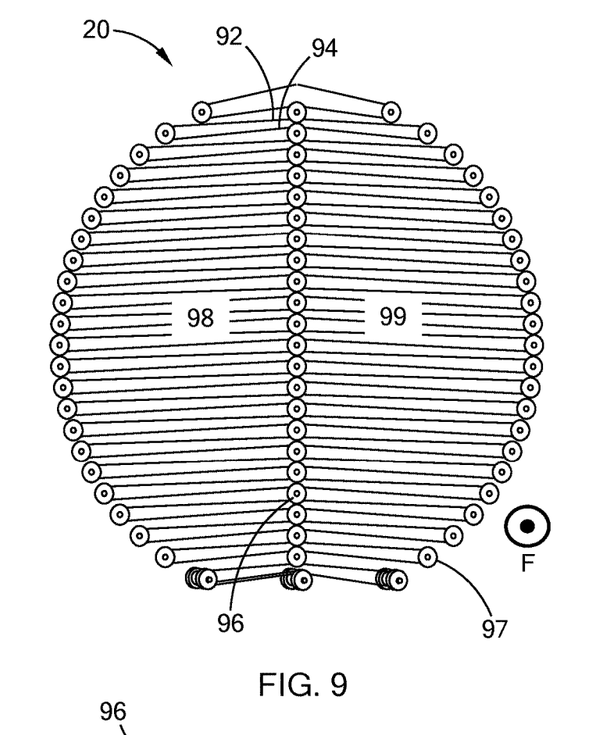
FIG. 9 is a front view, normal to the direction of fluid flow, of the heater of FIG. 8.

Referring to FIGS. 5 through 7, another form of a continuous resistive heating element is illustrated and indicated by reference numeral 70. In this form, the continuous resistive heating element 70 has a predefined shape that is a serpentine waveform as shown. The opposed waveform segments 72, 74 are similarly separated by dielectric members 76 and transverse supports 78. As further shown, the waveform segments 72, 74 include openings 80 (shown best in FIG. 7), which may facilitate additional dielectric members 76 and transverse supports 78, and/or provide a lighter weight construction with alternate flow characteristics.

Figure 10:
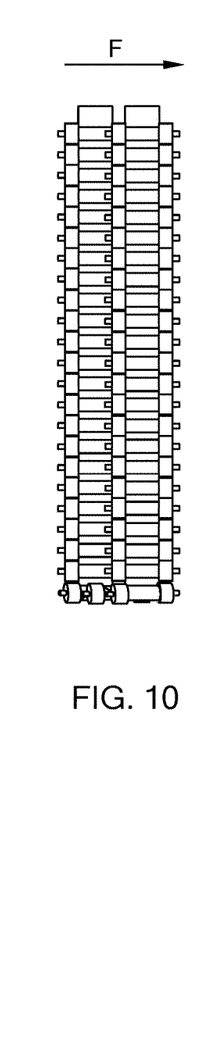
FIG. 10 is a side view of the heater of FIG. 8.
Figure 11:
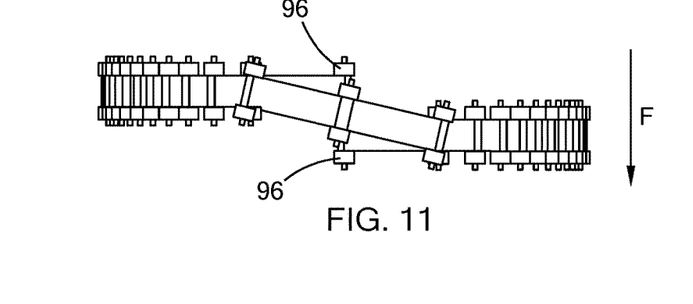
FIG. 11 is a top view of the heater of FIG. 8.

FIGS. 8 through 11 illustrate yet another form of a continuous resistive heating element, which is indicated by reference numeral 90. The continuous resistive heating element 90 includes opposed segments 92, 94 that have varying lengths extending radially, and dielectric bushings 96 (or members) are disposed vertically along a central portion of the passageway and radially (97) around a periphery of the passageway as shown. In this form, the continuous resistive heating element 90 is wrapped around the dielectric bushings 96/97, and more specifically around a reduced diameter portion as shown. As shown in FIGS. 10 and 11, each of the leg portions 98 and 99 are staggered axially, with the central dielectric bushings 96 being axially aligned or connected to each other.

Figure 12:
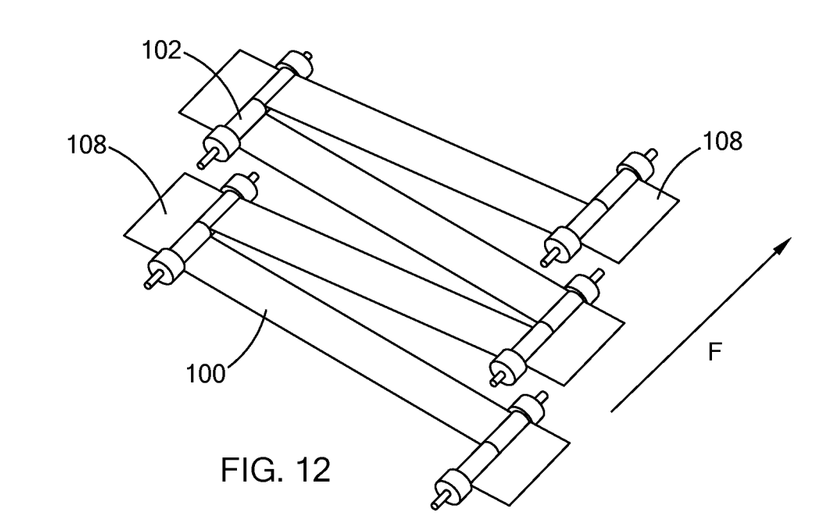
FIG. 12 is a perspective view of one form of a continuous resistive heating element and its attachment to dielectric members constructed in accordance with the teachings of the present disclosure.
Figure 13:
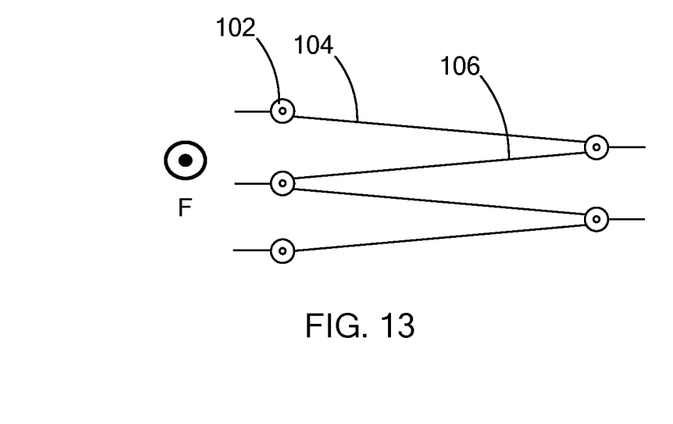
FIG. 13 is a front view, normal to the direction of fluid flow, of the resistive heating element of FIG. 12.
Figure 14:
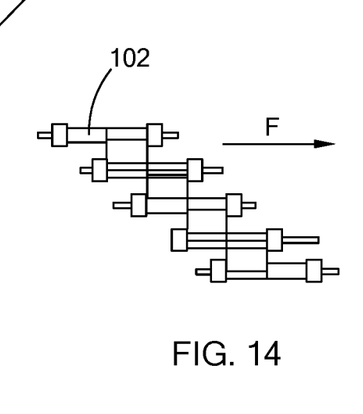
FIG. 14 is a side view of the resistive heating element and dielectric members of FIG. 12.

Referring to FIGS. 12 through 14, yet another form of the varying length opposed segments is illustrated in continuous resistive heating element 100. Rather than being wrapped around the dielectric members/bushings 102, the opposed segments 104/106 include end tabs 108 that may be used as terminations or for connection to additional heating circuits within the system. As shown in FIG. 14, the opposed segments 104/106 are staggered axially, for example, so as to provide requisite heating with reduced back pressure within the passageway.

Figure 15:
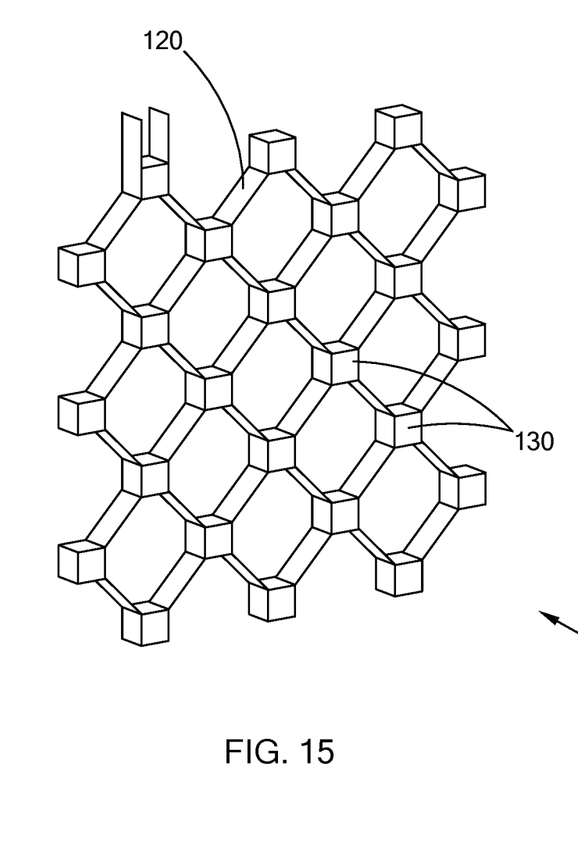
FIG. 15 is a perspective view of another form of a continuous resistive heating element having a polygonal geometry and separated by dielectric blocks constructed in accordance with the teachings of the present disclosure.
Figure 16:
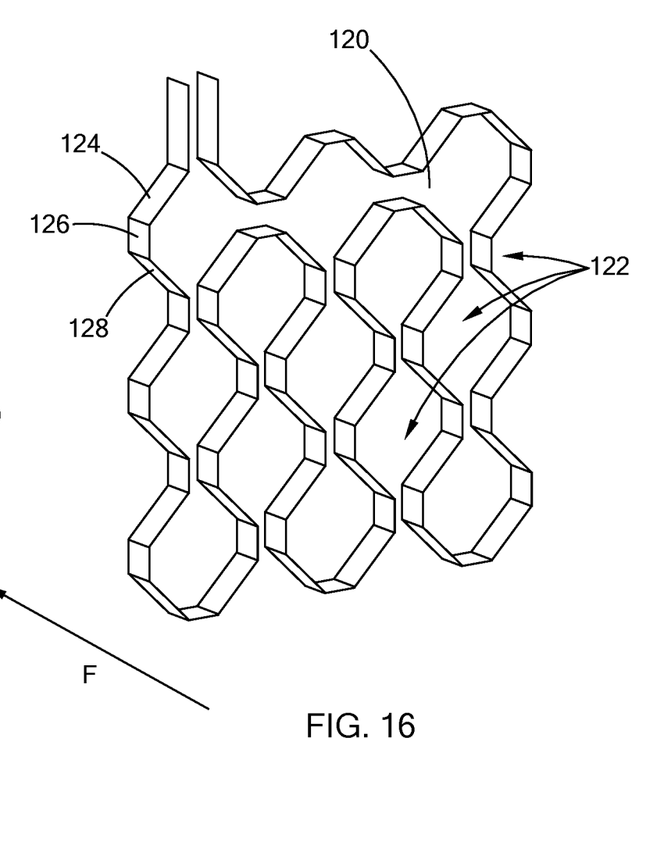
FIG. 16 is a perspective view of the continuous resistive heating element of FIG. 15 without the dielectric blocks.

Moving on to FIGS. 15 and 16, still another form of a continuous resistive heating element is illustrated and indicated by reference numeral 120. The continuous resistive heating element 120 has a predefined shape that includes a plurality of legs 122, each of the legs having a polygonal geometry. In this form, the polygonal geometry includes repeating sets of an outwardly extending segment 124, a transverse segment 126, and an inwardly extending segment 128, wherein each of the transverse segments 126 are separated by dielectric members 130, which are in the form of blocks in this alternative design.

Figure 17:
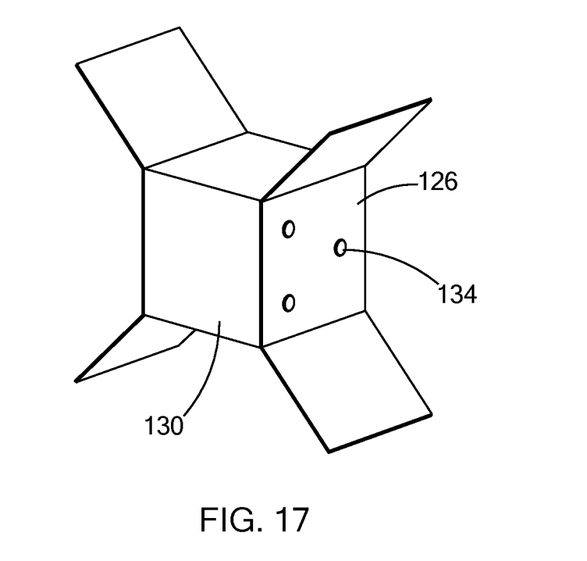
FIG. 17 is an enlarged partial view of one form of the polygonal geometry resistive heating elements secured to a dielectric block using mechanical fasteners and constructed in accordance with the teachings of the present disclosure.
Figure 18:
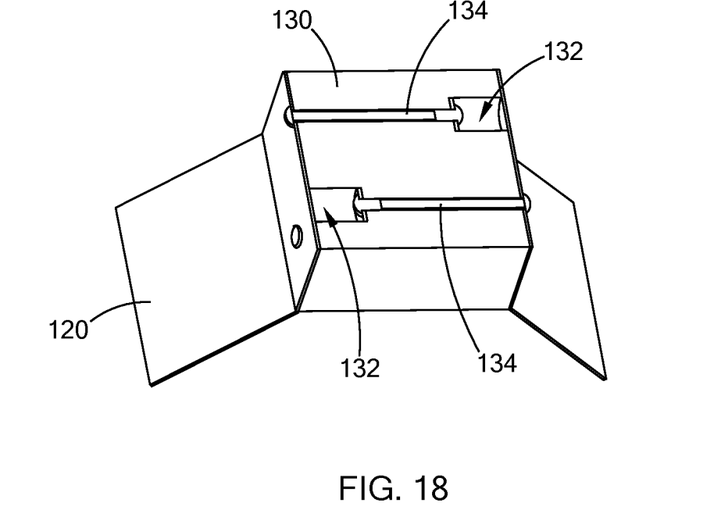
FIG. 18 is another enlarged partial view from a reverse side of FIG. 17 illustrating fastener cavities formed in the dielectric blocks and constructed in accordance with the teachings of the present disclosure.

As shown in FIGS. 17 and 18, the dielectric members 130 include recesses 132 to accommodate mechanical fasteners 134 to secure the transverse segment 126 to the dielectric member. It should be understood that the mechanical fasteners 134 are merely exemplary and should not be construed as limiting the type of connection between the continuous resistive heating element 120 and the dielectric members 130. For example, active brazing as set forth above, may also be employed while remaining within the scope of the present disclosure.

Figure 19A:
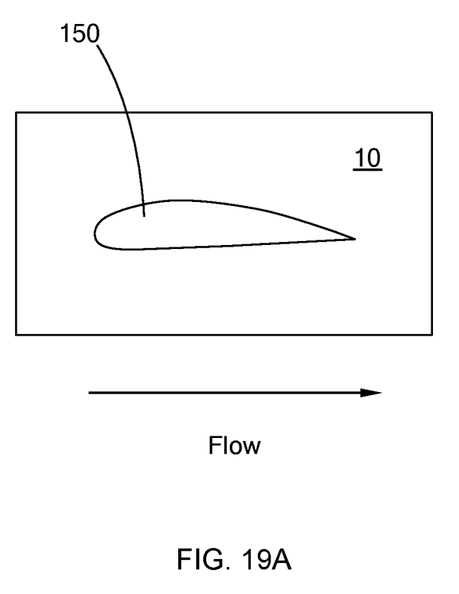
FIG. 19A is a side view of a resistive heating element having an airfoil shape and constructed in accordance with the teachings of the present disclosure.
Figure 19B:
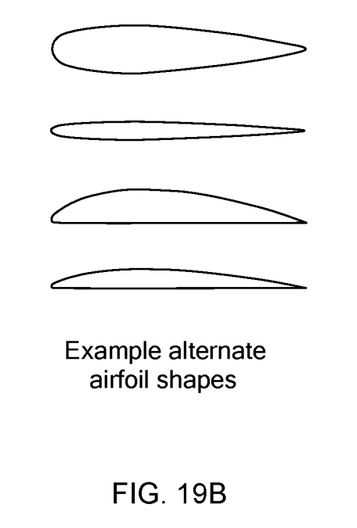
FIG. 19B is a side view of alternate airfoil shapes for the resistive heating element of FIG. 19A.

Referring now to FIG. 19A-19B, another form of a heater for use in heating a fluid flow through a passageway includes at least one resistive heating element having a predefined shape of an airfoil 150. The airfoil 150 may be hollow and may also be a shape memory alloy so as to change the shape of the airfoil according to flow requirements within the passageway. A plurality of airfoils 150 may be employed across a section, or at multiple axial locations along the passageway, or a single airfoil 150 may extend across the entire width of the passageway. Additionally, a variety of different types of airfoils may be used, including by way of example, different NACA (National Advisory Committee for Aeronautics) configurations, low camber, deep camber, symmetrical, or supersonic, among others. Example airfoil shapes are shown in FIG. 19B. Generally, the airfoil shape 150 is intended to reduce back pressure while provide the requisite heating profile to the fluid flow.

In another form, the cross-sectional geometry of the heater is non-uniform, or a changing cross-section such that high stiffness and enhanced heat transfer can be provided in some regions of the circuit and improved formability in other regions.

Figures 20A, 20B, 20C:
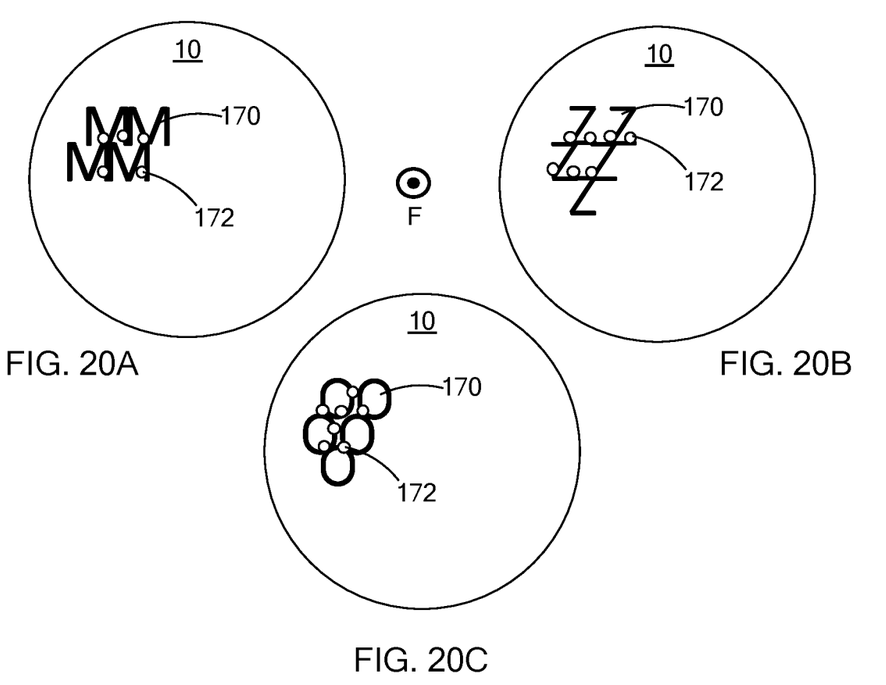
FIG. 20A is a front view, normal to a direction of fluid, illustrating a first form of a plurality of continuous resistive heating elements and corresponding dielectric spacers/members constructed in accordance with the teachings of the present disclosure.
FIG. 20B is a front view, normal to a direction of fluid, illustrating a second form of a plurality of continuous resistive heating elements and corresponding dielectric spacers/members constructed in accordance with the teachings of the present disclosure.
FIG. 20C is a a front view, normal to a direction of fluid, illustrating a third form of a plurality of continuous resistive heating elements and corresponding dielectric spacers/members constructed in accordance with the teachings of the present disclosure.

Referring to FIGS. 20A through 20C, additional forms of heaters for use in heating a fluid flow are shown that generally comprise a plurality of continuous resistive heating elements 170, each resistive heating element 170 having a predefined shape, the resistive heating elements 170 being directly exposed to the fluid flow, and a corresponding plurality of dielectric spacers 172 arranged between adjacent resistive elements 170, wherein the predefined shape includes a cross-sectional geometry that provides a required heat distribution, structural strength, and reduced back pressure. It should be noted that only partial arrangements of heating elements 170 and dielectric spacers 172 are illustrated herein for purposes of clarity, and thus the specific arrangement will be understood to vary across the entire area of the fluid passageway/conduit. In one form, at least one of the plurality of resistive heating elements and dielectric members enable mixing of the fluid flow.

Figure 20D:
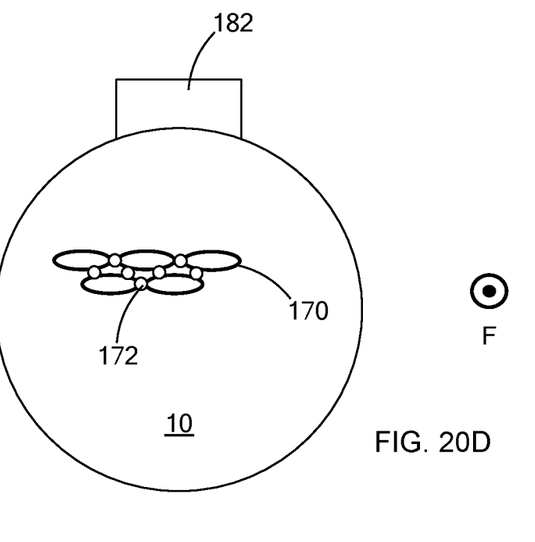
FIG. 20D is a front view, normal to a direction of fluid flow, illustrating a fourth forms of a plurality of continuous resistive heating elements and corresponding dielectric spacers/members constructed in accordance with the teachings of the present disclosure.
Figure 20E:
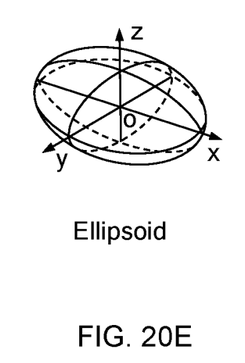
FIG. 20E is a perspective view of one of the continuous resistive heating elements of FIG. 20D, having an ellipsoid shape.

The predefined shape may be, by way of example, an "M" as shown in FIG. 20A, a "Z" as shown in FIG. 20B, or an "O" as shown in FIG. 20C. The predefined shape may be any one of these or a combination thereof, in addition to other exemplary shapes of a "U," a "C," an "I," a "T," a "V," a spline, and/or a closed shape cross-section. The closed shape may be hollow and/or may be non-circular as shown in FIG. 20D, such as an ellipsoid (as shown in FIG. 20E), oval, or teardrop (not shown).

The resistive heating elements 170 may be connected in one of a series circuit or a combination of series and parallel circuits.

The cross-sectional geometry may be positioned normal to the fluid flow as shown, or may be positioned transverse to the fluid flow, or in other orientations and/or combinations thereof while remaining within the scope of the present disclosure.

As set for the above, the resistive heating elements 170 may include apertures through which fluid can flow such that fluid flows around and through the resistive heating elements 170.

As shown in FIG. 20D, a fluid conduit 10 is shown having an interior wall and at least one dielectric material 172 disposed between resistive heating elements 170. The fluid conduit may include an electrical box 182 affixed thereto for protecting electrical connections to the heater. The electrical box 182 further comprises a current switching device in one form of the present disclosure. In another form, the electrical box 182 further includes a distributed operations system, such as that disclosed in U.S. Pat. No. 7,627,455, which is commonly assigned with the present application and the contents of which are incorporated herein by reference in its entirety. It should also be understood that the flow relative to the predefined shapes may be parallel to the predefined shapes, a cross-flow, or any other orientation of flow relative to the predefined shapes while remaining within the scope of the present disclosure.

Figure 21A:
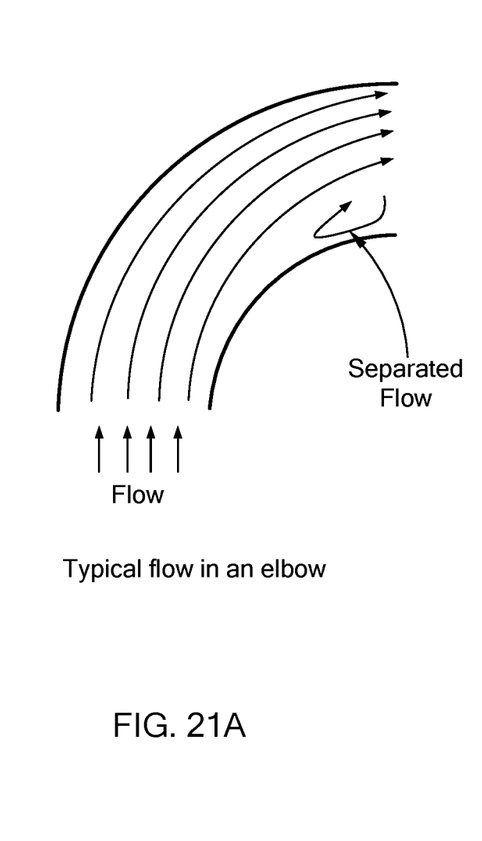
FIG. 21A is a schematic view illustrating a typical flow in an elbow without a dual-purpose heater.
Figure 21B:
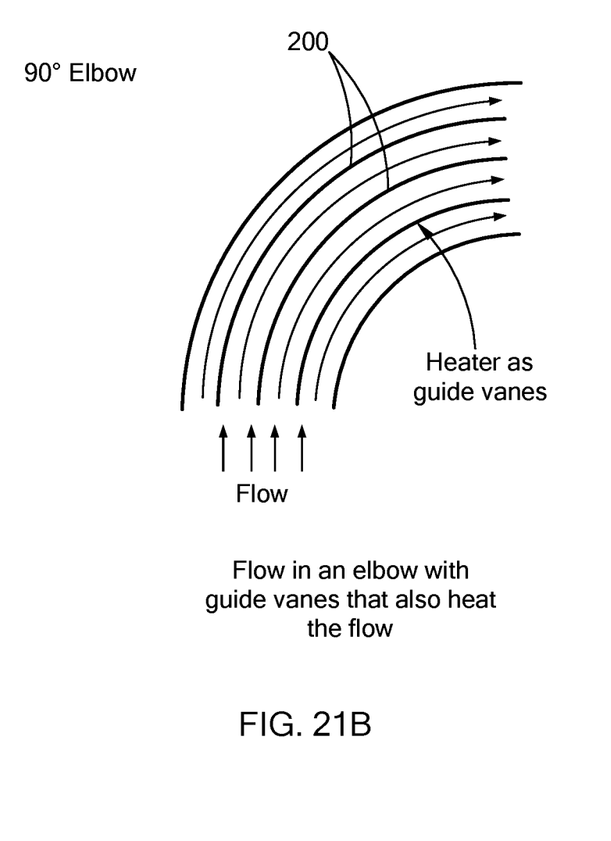
FIG. 21B is a schematic view illustrating one form of dual-purpose heaters as flow diffusers and constructed in accordance with the teachings of the present disclosure.
Figures 22A, 22B:
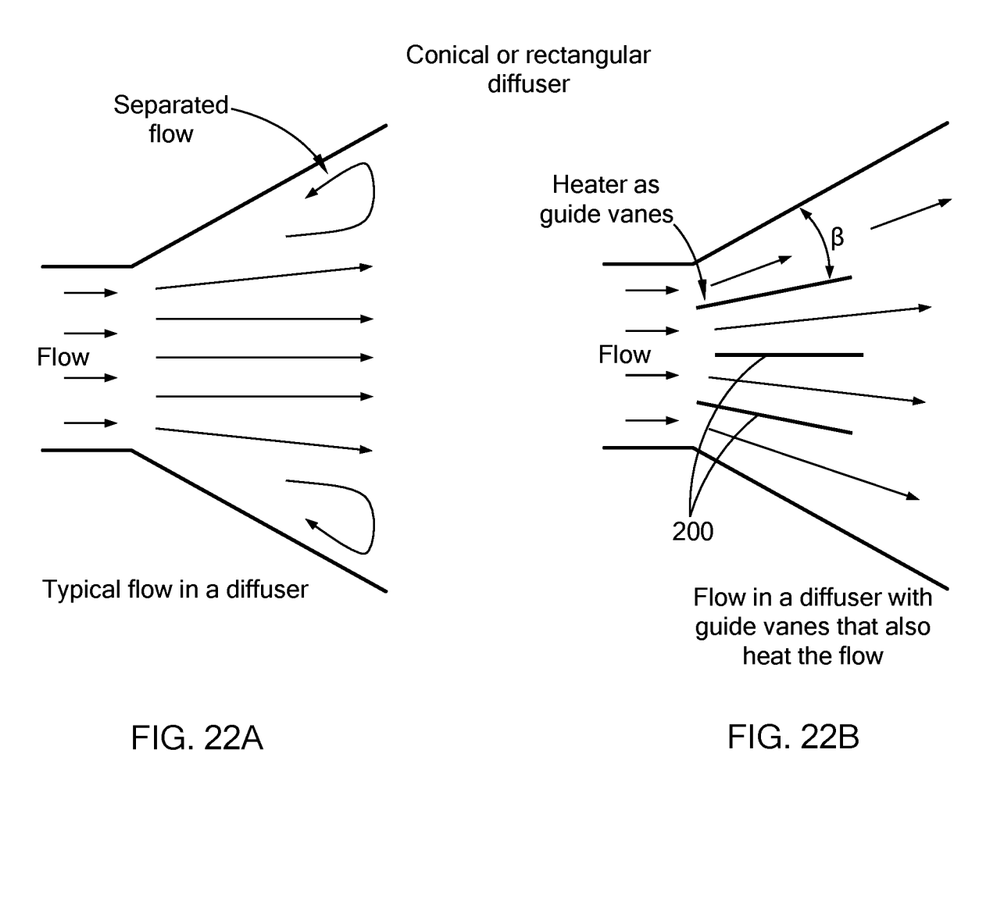
FIG. 22A is a schematic view illustrating a typical flow in a diffuser without a dual-purpose heater.
FIG. 22B is a schematic view illustrating another form of dual-purpose heaters as flow diffusers constructed in accordance with the teachings of the present disclosure.

Referring now to FIGS. 21A-B and 22A-B, a dual-purpose resistive heating element having a predefined shape and being directly exposed to fluid flow also functions as a flow guide, which is illustrated and indicated by reference numeral 200. As shown in FIG. 21A, fluid that flows around a bend portion (e.g. 90° elbow), or a nonlinear portion, tends to separate from the walls of the fluid passageway, or conduit, as shown. In one form, the dual-purpose resistive heating element 200 is used as a guide vane as shown in FIG. 21B, in which the resistive heating elements 200 are arranged substantially parallel to a direction of the fluid flow and define a semi-circular geometry in this form. Similarly, in FIG. 22A, fluid flow tends to separate through a diffuser. As shown in FIG. 22B, the resistive heating elements 200 are disposed substantially parallel to a direction of the fluid flow through an increasing cross-sectional area of the diffuser, or conduit, in order to act as a guide. It should be understood that this dual-purpose resistive heating element 200 may be employed in any cross-sectional area of a fluid passageway or conduit while remaining within the scope of the present disclosure. For example, the resistive heating elements 200 may be arranged substantially parallel to a direction of the fluid flow through a decreasing cross-sectional area of a conduit.

In another form of the present disclosure, any of the resistive heating elements and/or dielectric spacers/members as disclosed herein may be configured to mix the fluid flow.

In still another form, at least one of the resistive heating elements has a temperature coefficient of resistance such that the resistive heating element functions as a heater and a temperature sensor. Such a heating system is disclosed in U.S. Pat. No. 7,196,295, which is commonly owned with the present application and the contents of which are incorporated herein by reference in their entirety.

In another variant, a variable wattage control system is employed, such as that disclosed in U.S. Pat. No. 7,257,464, which is also commonly owned with the present application and the contents of which are incorporated herein by reference in their entirety.

In still another form, at least a portion of a surface of the resistive heating element(s) is coated with a catalyst for promoting a chemical reaction of at least one constituent compound or element of the fluid flow.

In another design, the resistive heating elements form multiple electrical circuits arranged to provide a predetermined distribution of heat.

In still another form, the bare resistive heating elements, or portions thereof, may be coated with a dielectric material, such as by way of example, a nitride layer of approximately 0.030" in thickness in order to provide electrical isolation as desired in a particular application.

It should be understood that the various forms of continuous resistive heating elements having predefined shapes may be oriented along the direction of flow, as primarily illustrated throughout, or they may be oriented transverse to the flow or in another orientation, or even combinations thereof while remaining within the scope of the present disclosure. Additionally, the various predefined shapes as illustrated and described herein may have open cross-sections, closed cross-sections, or combinations thereof, and/or may include apertures extending through their walls for purposes of achieving a required heat distribution, structural strength, weight, cost, and/or reduced back pressure.

It should also be understood that a "fluid" should be construed to mean a gas, liquid, or plasma and is not limited to the example of a diesel exhaust gas as set forth above.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A heater for use in heating a fluid flow through a passageway, comprising:
   a single resistive heating element exposed to the fluid flow, the single resistive heating element comprising a plurality of segments arranged in a predefined shape; and
   a plurality of discrete dielectric members, wherein each discrete dielectric member is delimited between a corresponding opposed pair of segments of the plurality of segments to space the corresponding opposed pair of segments apart by a predetermined space,
   wherein the predefined shape defines a plurality of legs, each leg of the plurality of legs defining a polygonal geometry,
   wherein the polygonal geometry includes repeating sets of an outwardly extending segment, a transverse segment, and an inwardly extending segment, wherein each of the transverse segments are separated by the plurality of discrete dielectric members.

2. The heater according to claim 1, wherein the plurality of discrete dielectric members includes at least one of bushings, blocks, tubes, and combinations thereof.

3. The heater according to claim 1, wherein the predefined shape defines a non-uniform cross-section.

4. The heater according to claim 1 further comprising a plurality of resistive heating elements, wherein the plurality of resistive heating elements includes the single resistive heating element, wherein the plurality of resistive heating elements are connected in one of a series circuit, a parallel circuit, and a combination of series and parallel circuits.

5. The heater according to claim 1 further comprising a plurality of resistive heating elements, wherein the plurality of resistive heating elements includes the single resistive heating element, wherein the plurality of resistive heating elements include apertures sized and shaped to allow fluid to flow around and through the plurality of resistive heating elements.

6. The heater according to claim 1 further comprising the passageway and a plurality of resistive heating elements, wherein the plurality of resistive heating elements includes the single resistive heating element, wherein the passageway includes a non-linear portion, wherein the plurality of resistive heating elements are arranged parallel to the fluid flow through the non-linear portion of the passageway.

7. The heater according to claim 1 further comprising a plurality of resistive heating elements, wherein the plurality of resistive heating elements includes the single resistive heating element, wherein at least one resistive heating element of the plurality of resistive heating elements and at least one discrete dielectric member of the plurality of discrete dielectric members enables mixing of the fluid flow.

8. The heater according to claim 1, wherein the single resistive heating element has a temperature coefficient of resistance enabling the single resistive heating element to operate as a heater and a temperature sensor.

9. The heater according to claim 1, wherein at least a portion of a surface of the single resistive heating element includes a catalyst for promoting a chemical reaction of at least one constituent compound and element of the fluid flow.

10. A fluid conduit comprising:
the heater of claim 1;
an interior wall defining a chamber for housing the heater; and
an electrical box configured to protect electrical connections to the heater, wherein the electrical box further includes at least one of a current switching device and a distributed operations system.

11. A heater for use in heating a fluid flow, the heater comprising:
a conduit defining a flow path of the fluid flow, the conduit having a shape including an increasing or decreasing cross-sectional area along the flow path; and
at least one resistive heating element exposed to the fluid flow within the conduit, the at least one resistive heating element defining at least one heated surface of a plurality of guide vanes exposed to the fluid flow and configured to redirect the fluid flow,
wherein the guide vanes are disposed within the increasing or decreasing cross-sectional area and wherein a distance between the guide vanes increases in a flow direction of the conduit to guide the fluid flow in the increasing cross-sectional area of the conduit or decreases in a flow direction of the conduit to guide the fluid flow in the decreasing cross-sectional area of the conduit,
wherein the at least one resistive heating element has an airfoil cross-sectional geometry.

12. The heater according to claim 11, wherein the at least one resistive heating element includes a shape-change material configured to change the airfoil cross-sectional geometry to impact fluid flow.

13. The heater according to claim 12, wherein the shape-change material includes a shape memory alloy.

14. The heater according to claim 12, wherein the cross-sectional geometry is non-uniform.

15. The heater according to claim 12 wherein the at least one resistive heating element comprises a plurality of resistive heating elements, wherein the plurality of resistive heating elements form a plurality of electrical circuits enabling at least one of a predetermined distribution of heat, a dynamic distribution of heat, and combinations thereof.

16. The heater according to claim 11, wherein the conduit has the shape including the increasing cross-sectional area along the flow path, wherein the guide vanes are disposed within the increasing cross-sectional area and wherein the distance between the guide vanes increases in the flow direction of the conduit to guide the fluid flow in the increasing cross-sectional area of the conduit.

17. A heater for use in heating a fluid flow, the heater comprising:
a conduit defining a flow path having a bend; and
at least one resistive heating element exposed to the fluid flow within the conduit, the at least one resistive heating element defining at least one heated surface of a plurality of guide vanes exposed to the fluid flow and configured to redirect the fluid flow to reduce back pressure, provide a desirable temperature distribution, or provide desirable flow constituent distribution,
wherein the plurality of guide vanes are substantially parallel to the bend of the flow path to guide the fluid flow around the bend.

18. The heater according to claim 17, wherein the bend is a 90° bend.

19. The heater according to claim 17, wherein the at least one guide vane follows the bend from a start of the bend to an end of the bend.

20. The heater according to claim 17, wherein the at least one resistive heating element has an airfoil cross-sectional geometry.

* * * * *